G. GORTON.
INSERTED CUTTER SECURING AND ADJUSTING DEVICE.
APPLICATION FILED NOV. 4, 1912.
1,090,205.   Patented Mar. 17, 1914.
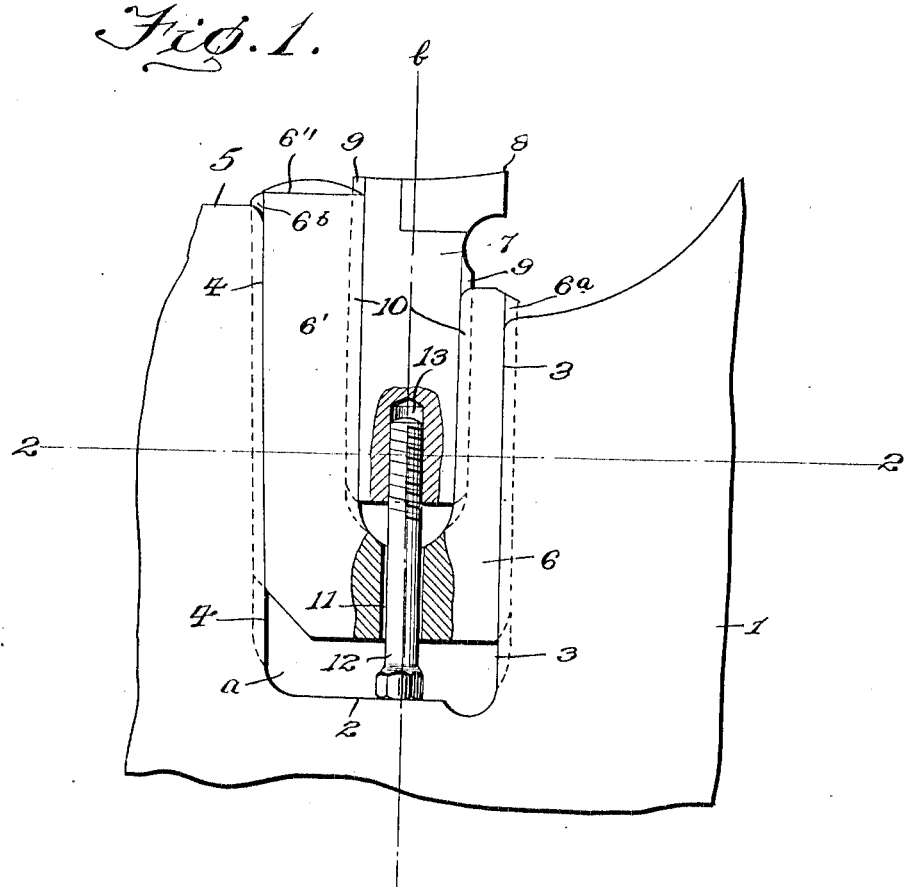
WITNESSES
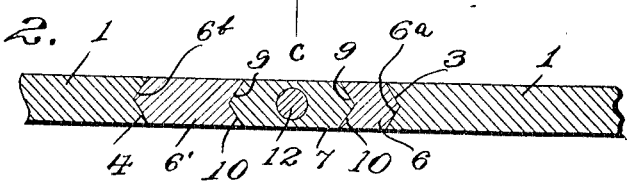
INVENTOR
George Gorton

UNITED STATES PATENT OFFICE.

GEORGE GORTON, OF RACINE, WISCONSIN.

INSERTED-CUTTER SECURING AND ADJUSTING DEVICE.

1,090,205.  Specification of Letters Patent.  Patented Mar. 17, 1914.

Application filed November 4, 1912. Serial No. 729,441.

*To all whom it may concern:*

Be it known that I, GEORGE GORTON, a citizen of the United States, residing at Racine, in the county of Racine and State of Wisconsin, have invented certain new and useful Improvements in Inserted-Cutter Securing and Adjusting Devices, of which the following is a specification.

This invention relates to certain improvements in and relating to rotary cutting off saws and the like; and the objects and nature of the invention will be readily understood by those skilled in the art in the light of the following explanation of the accompanying drawings illustrating what I now believe to be the preferred embodiment from among other formations, and arrangements within the scope of my invention as defined by the appended claims.

It is an object of my invention to simplify and strengthen the holding and locking devices for the cutters of internal metal cutting off saws, with the ends in view of reducing to the minimum danger of lateral displacement of such holders with their cutters, and of "bell mouthing" the pockets in the saw blades by broken cutters.

A further object of the invention is to provide cutters and their holders for rotary cutting off saws wherein simple and improved provisions are made for cutter adjustment.

The invention consists in certain novel features in construction and in combinations and arrangements as more fully and particularly set forth hereinafter.

Referring to the accompanying drawings:—Figure 1, is a side elevation showing a portion of a rotary internal saw blade provided with a cutter holder and cutter in accordance with my invention, parts being broken away. Fig. 2, is a section on the line 2—2, Fig. 1.

In the drawings, I show a portion of a rotary saw blade 1, having a central work-receiving opening adapted to receive the work or stock to be severed by the saw cutters. This blade carries cutters uniformly arranged around this central opening and projecting from the inner edge of the blade to operate on the work. This internal or central-opening saw is adapted to be secured around its outer edge or circumferential portion to a suitable hollow rotary driving drum. The blade is formed with a series of similar uniformly-spaced pockets *a*, arranged around and at their inner ends open to the central work-receiving opening. These pockets are usually arranged approximately radially of the saw blade, and each pocket has an outer end abutment or transverse floor 2, a straight longitudinal front edge wall 3, preferably approximately parallel with the center line *b*—*c*, and a straight longitudinal rear edge wall 4, inclining inwardly and rearwardly from the floor 2, of the pocket to the inner edge 5, of the saw blade.

A series of similar cutter holders 6, is provided, one for each pocket, each cutter holder being adapted to any pocket. Each holder is provided with a cutter 7. Each cutter holder is approximately U-shaped and formed with a longitudinal pocket or socket open at its inner end and longitudinally receiving an elongated or oblong cutter or cutter block 7, so that the cutter extends through or beyond the open inner end of such socket with the working point 8, of the cutter in operative position within the center opening of the saw. The cutter is formed with elongated preferably parallel front and rear longitudinal edges 9, fitting the parallel front and rear longitudinal adjacent edges 10, of the legs of the holder that form the walls of said socket. These edges 9, and 10, are correspondingly formed to intermesh and hold the cutter against lateral displacement from the holder and yet permit longitudinal sliding adjustment of the holder on the cutter or of the cutter within the holder. If so desired, the edges of the cutter can be transversely and oppositely beveled to form each with a longitudinal central V rib, and the edges 10, of the holder can be correspondingly recessed to form each with a central longitudinal V-groove.

The rear leg 6', of the holder is formed of increased width and length with respect to the front leg to constitute a proper backing and support for the cutter when in action and to protect the blade 1, so far as possible from "bell mouthing" and injury resulting from broken cutters. This rear leg of the holder is also shaped and formed to constitute a locking wedge or key, whereby the holder is locked in the blade pocket and whereby the cutter is locked in the holder. The upper end 6'', of said rear leg of the holder is also preferably extended and formed to constitute a driving head to which the necessary force is applied to drive the holder home and to locked position in the blade pocket.

The front straight longitudinal edge 6ª, of the holder is preferably parallel with the center line b—c, and hence parallel with the blade pocket edge 3, while the straight rear longitudinal edge 6ᵇ, of the holder is inclined approximately to correspond to the inclination of the edge 4, of the blade pocket whereby the holder is rendered wedge shaped. The edges 6ª, 6ᵇ, and 3, 4, are preferably formed to intermesh and maintain the holder in the blade against lateral displacement and yet permit the holder to slide longitudinally into and from the pocket. These edges are preferably formed with V grooves and ribs as described in connection with edges 9, 10.

After the cutter has been placed in the holder, the holder is driven home in the blade pocket by application of the necessary force to the head 6″. The wedging edges 6ᵇ, 4, will most rigidly lock the holder in the pocket and sufficiently compress the holder to lock the cutter therein. The holder can be removed when necessary by the application of the necessary force to the end of the holder adjacent to floor or abutment 2.

Material advantages are attained by dispensing with the employment of locking keys and wedges and by thus forming the holder to constitute a wedge. The structure is thereby materially increased in strength to resist lateral displacement and in protecting the blade against injury due to cutter breakage.

The transverse portion of the lower end of the holder forming the end wall of the cutter-receiving socket, is formed with a hole or passage 11, arranged longitudinally of the holder and along the longitudinal center line b—c, of the cutter. The cutter heel 12, extends loosely through this passage 11, and is freely movable longitudinally therein with the cutter when the cutter is moved longitudinally in the holder. The heel 12, sustains the longitudinal thrust of the cutter when in action and abuts against the floor 2, and determines the radial adjustment of the cutter. The radial adjustment of the cutter is determined by maintaining a certain known distance between the working point 8, of the cutter after sharpening, and the end face of the heel 12, that abuts against floor 2. This required distance is attained (after the cutter has been sharpened, and before the cutter is fixed in the saw blade with and by the holder) by shortening or lengthening the projection of the heel 12, beyond the outer end of the cutter proper. For instance, in the particular example illustrated, the heel 12, is formed by a threaded pin screwing into and longitudinally adjustable in a central longitudinal tapped hole or socket 13, in the cutter block. The pin could be driven into the socket 13, and radial adjustment of the cutter could be attained by grinding off the outer end of the pin, and when any pin became too short it could be removed and a new full length pin inserted. I prefer to form the heels 12 of relatively soft metal with respect to the metal of the cutters and holders, so that the pins will upset or otherwise give way under excessive outward longitudinal cutter thrust. For instance, I can use pins of copper or some other suitable metal or alloy. If by reason of cutter breakage or from other abnormal causes, a cutter is subjected to excessive outward longitudinal thrust, damage to the saw blade or to the cutter, will often be avoided if the cutter under such abnormal conditions can move longitudinally outwardly within its holder and radially of the saw blade. This is rendered possible by the use of relatively soft metal cutter heels or thrust sustaining pins. When thus upset new pins can be readily applied. In this connection it should be noted that the cutter heels or pins 12, are preferably of such length that when seated against the floors 2, of the saw blade pockets after the holders have been driven into locking positions, the ends of the cutter blocks are spaced from the closed ends of the sockets in the holders. The cutters are thus free to move longitudinally in the holders in the event that a cutter is subjected to such excessive abnormal thrust longitudinally thereof as may be sufficient to move the cutter and upset its relatively soft heel.

As hereinbefore stated the length of a cutter from point to end edge of heel is determined before the cutter and its holder are applied to the blade. When the holder is inserted in a pocket, the heel of the cutter will engage the abutment 2, before the holder is driven home to cutter locking position and hence when being driven home to final locked position the holder slides on the cutter, the radial adjustment of the cutter being determined by the engagement of its heel with the abutment 2 irrespective of the longitudinal position of the holder in the blade pocket. If the cutter should be of such length as not to engage the closed end of the holder, and if such cutter should be subjected to excessive stress (as might be caused by breakage of the point of the cutter and wedging of the broken off point between the work and end of the cutter) it will be forced longitudinally toward the closed end of the holder and upset the relatively soft heel 12. The holder will be thereby relieved of stress tending to force its rear leg rearwardly with a consequent tendency to bell mouth or upset that portion of the blade pocket against which the rear edge of the holder abuts. In this connection, however, I wish to call attention to the fact that it is often desirable to use heels 12, made of steel instead of copper so as to provide a material somewhat stiffer and not so susceptible to compression as copper.

It is evident that various changes might be resorted to in the forms, constructions and arrangements described, without departing from the spirit and scope of my invention as set forth in the annexed claims, and hence I do not wish to limit myself to the exact disclosure hereof.

What I claim is,—

1. A holder for an inserted cutter, of the character substantially as described, having an intermediate longitudinal cutter socket, the rear leg of the holder having an inclined wedge edge and an outer end striking head, in combination with a cutter block arranged in said socket and adjustable longitudinally thereof and provided with a heel projecting through the holder and determining the radial adjustment of the cutter.

2. A saw blade having a pocket and a U-shaped cutter holder adapted to be removably wedged and thereby locked in said pocket and having a cutter removably arranged in the socket formed by the U-shape of such holder, the rear leg of said holder being wedge shape and enlarged to back said cutter and to form a driving head.

3. A saw blade having a wedge shaped pocket, and a cutter holder having an inclined longitudinal edge whereby said holder is adapted to be driven and wedged into said pocket, said holder being provided with a cutter arranged therein and adapted to be locked by the wedging of the holder in the pocket, said cutter having a heel determining the radial adjustment of the cutter and projecting through the holder to abut the floor of said pocket.

4. Holders and inserted cutters for rotary cutting off saws, each holder being of U-shape with the adjoining longitudinal edges of its legs parallel, a cutter block having parallel longitudinal edges slidably engaging said edges of the holder and intermeshing therewith against lateral displacement, said holder having a transverse passage through its closed end, said cutter having a heel projecting through and movable longitudinally in said passage to determine radial adjustment of the cutter independently of the holder, said heel being formed by a pin normally fixed in the cutter.

5. A holder for the inserted cutter of a rotary cutting off saw, said holder adapted to be wedged in a pocket in a saw blade, said holder being U-shaped and having a longitudinal passage through its closed end, in combination with a cutter arranged in said holder and having a relatively soft heel forming a longitudinal continuation of the cutter and projecting through said passage and adapted to seat against the floor of the blade pocket and determine the radial adjustment of the cutter.

6. A rotary saw blade having a pocket with an abutment floor, in combination with a holder adapted to be locked in said pocket, said holder being U-shaped and having a passage through its closed end, a cutter fitting and adapted to be locked by said holder, said cutter having a longitudinal threaded socket, and a cutter heel-forming pin longitudinally adjustable in said socket and carried by and forming a continuation of said cutter through said passage and adapted to abut against said floor to determine the radial adjustment of said cutter.

7. A holder for an inserted cutter, of the character substantially as described, having an intermediate longitudinal cutter socket, the rear leg of the holder having an outer longitudinal inclined wedge edge, the outer longitudinal edges of said holder formed to interlock with the longitudinal edge walls of a saw blade pocket receiving said holder against lateral displacement, in combination with a cutter block longitudinally arranged in said socket and having its longitudinal edges interlocking with the longitudinal walls of said socket against lateral displacement.

8. A saw blade having a wedge-shaped pocket, in combination with a holder having an inclined longitudinal edge fitting a corresponding wall of a pocket whereby the holder is wedged and locked therein and to the blade, each holder having a longitudinal socket, and an inserted cutter block in said socket and at its longitudinal edges interlocking with said holder against lateral displacement therefrom.

9. A saw blade having a wedge-shaped pocket formed with an abutment floor, in combination with an inserted-cutter holder, and means to engage said floor and determine radial cutter adjustment, said holder having a cutter socket and a removable cutter fitted therein against lateral displacement, said holder being wedge shape and at its longitudinal edges fitting the longitudinal walls of said pocket to resist lateral displacement.

10. A saw blade having a pocket formed with longitudinal walls at least one of which is inclined to form the pocket wedge shape, in combination with an inserted-cutter holder adapted to said pocket and having exterior longitudinal edges at least one of which is inclined to form said holder wedge shape, said pocket having a cutter socket with parallel longitudinal edge walls, and a cutter block removably fitted in said socket and having longitudinal edges interlocking with the edge walls of said socket to resist lateral displacement, the edges of said holder interlocking with the walls of said pocket to resist lateral displacement.

11. A saw blade having a wedge-shape pocket with an abutment floor, in combination with an inserted-cutter holder having a longitudinal socket formed with parallel edge walls, and a parallel-edge cutter block in said socket and interlocking with said holder to resist lateral displacement and provided with a heel engaging said abutment to determine the radial adjustment of the cutter, said holder being wedge shape to drive into the pocket and lock the cutter block by compression of the holder.

12. A saw blade having a pocket with an abutment floor, in combination with an inserted-cutter holder wedged in said pocket and formed with a cutter socket, and a cutter in said socket and interlocking with said holder to resist lateral displacement and provided with a heel normally fixed thereto and engaging said abutment to determine the radial adjustment of said cutter.

13. A saw blade having a pocket with an abutment floor, in combination with an inserted-cutter holder removably locked in said pocket and formed with a cutter socket, and a cutter in said socket and provided with and carrying an extensible heel abutting said floor and determining the radial adjustment of said cutter.

14. A saw blade having a pocket, in combination with an inserted-cutter holder wedged in said pocket and having a cutter socket with parallel longitudinal edge walls, and a cutter block in said socket and having parallel longitudinal edges fitting said edge walls, said holder having a longitudinal edge parallel with said edge walls and an edge inclined with respect thereto, said pocket having an edge wall parallel with the socket walls of the holder and an edge wall inclined with respect thereto.

15. A holder and inserted cutter for a rotary cutting off saw blade having flaring wedging pockets with abutments, said holder having its longitudinal edges formed to fit the longitudinal edge walls of a pocket of said blade in longitudinal wedging adjustment and against lateral deflection, said holder being wedge shape for driving longitudinally into and locking in said pocket, and having an intermediate longitudinal cutter pocket longitudinally receiving said cutter, said cutter provided with a heel engaging the abutment of said pocket to determine cutter radial adjustment, said holder slidable longitudinally of said cutter without disturbing its radial adjustment when said holder is driven home to wedge the same in the pocket and lock the holder and cutter together.

16. A holder and inserted cutter for a rotary cutting off saw blade having flaring wedging pockets with abutments, said holder having its longitudinal edges formed to fit the longitudinal edge walls of a pocket of said blade in longitudinal wedging adjustment and against lateral deflection, said holder being wedge shaped for driving longitudinally into and locking in said pocket, and having an intermediate longitudinal cutter pocket longitudinally receiving said cutter against lateral deflection; whereby said holder can be directly driven and wedged in its cutter blade pocket to lock the same therein and the cutter in the holder without the employment of separate wedge or key.

In testimony whereof I affix my signature in presence of two witnesses.

GEORGE GORTON.

Witnesses:
  E. S. GERE,
  C. R. CARPENTER.

---

Copies of this patent may be obtained for five cents each, by addressing the "Commissioner of Patents, Washington, D. C."